(12) United States Patent
Hunukumbure et al.

(10) Patent No.: US 12,058,079 B2
(45) Date of Patent: Aug. 6, 2024

(54) APPARATUS AND METHOD FOR POSITIONING IN WIRELESS COMMUNICATION SYSTEM

(71) Applicant: Samsung Electronics Co., Ltd., Suwon-si (KR)

(72) Inventors: Mythri Hunukumbure, Staines (GB); Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 17/631,219

(22) PCT Filed: Aug. 3, 2020

(86) PCT No.: PCT/KR2020/010232
§ 371 (c)(1),
(2) Date: Jan. 28, 2022

(87) PCT Pub. No.: WO2021/025414
PCT Pub. Date: Feb. 11, 2021

(65) Prior Publication Data
US 2022/0271903 A1 Aug. 25, 2022

(30) Foreign Application Priority Data

Aug. 8, 2019 (GB) .................................. 1911341.4

(51) Int. Cl.
*H04L 27/26* (2006.01)
*H04L 5/00* (2006.01)

(52) U.S. Cl.
CPC .......... *H04L 5/0092* (2013.01); *H04L 5/0051* (2013.01); *H04L 27/26025* (2021.01); *H04L 27/2613* (2013.01)

(58) Field of Classification Search
CPC .......... G01S 1/24; G01S 5/02213; G01S 5/06; H04L 1/08; H04L 27/26025;
(Continued)

(56) References Cited

U.S. PATENT DOCUMENTS 9,577,805 B2 2/2017 Chung et al.
11,258,486 B2 2/2022 Kim et al.
(Continued)

FOREIGN PATENT DOCUMENTS

CN 102461015 A 5/2012
CN 109478909 A 3/2019
(Continued)

OTHER PUBLICATIONS

Samsung ("DL and UL Reference Signals Design for NR Positioning", R1-1904394, 3GPP TSG RAN WG1 #96b, Xi'an, China, Apr. 2, 2019) (Year: 2019).*
(Continued)

*Primary Examiner* — Melvin C Marcelo
*Assistant Examiner* — Natali Pascual Peguero
(74) *Attorney, Agent, or Firm* — Jefferson IP Law, LLP (57) ABSTRACT

A method of a first base station in a wireless communication system is provided. The method may include: determining a parameter associated with repeated transmissions of a Sounding Reference Signal (SRS) based on a first sub-carrier spacing and one or more second sub-carrier spacings for the first base station and one or more second base stations, respectively; transmitting the determined parameter associated with the repeated transmissions of the SRS to a terminal; and performing positioning of the terminal based on the SRS transmitted repeatedly from the terminal.

15 Claims, 5 Drawing Sheets

(58) Field of Classification Search
CPC ........... H04L 27/2613; H04L 27/26132; H04L 27/2646; H04L 5/0007; H04L 5/0028; H04L 5/0048; H04L 5/0051; H04L 5/0091; H04L 5/0092; H04W 24/10; H04W 64/00; H04W 24/02; H04W 64/006
See application file for complete search history.

(56) References Cited

U.S. PATENT DOCUMENTS

| | | |
|---|---|---|
| 11,522,660 B2 | 12/2022 | Yoo et al. |
| 2016/0338050 A1 | 11/2016 | Kim et al. |
| 2017/0094547 A1 | 3/2017 | Yum et al. |
| 2019/0109732 A1 | 4/2019 | Choi et al. |
| 2019/0158236 A1 | 5/2019 | Yoo et al. |
| 2019/0215110 A1 | 7/2019 | Yang et al. |
| 2020/0280404 A1 | 9/2020 | Qin et al. |
| 2020/0404593 A1 | 12/2020 | Yao et al. |

FOREIGN PATENT DOCUMENTS

| | | |
|---|---|---|
| KR | 10-2019-0056897 A | 5/2019 |
| WO | 2019/096244 A1 | 5/2019 |
| WO | 2019/096317 A1 | 5/2019 |
| WO | 2020/166898 A1 | 8/2020 |

OTHER PUBLICATIONS

Catt, "DL and UL Reference Signals for NR Positioning", 3GPP TSG RAN WG1 #96bis, R1-1905346, Xi'an, China, April, 8-12, 2019.

Samsung, "DL and UL Reference Signals Design for NR Positioning", 3GPP TSG RAN WG1 #96b, R1-1904394, Xi'an, China, April, 8-12, 2019.

Ericsson, "UL Reference Signals for NR Positioning", 3GPP TSG RAN WG1 Meeting #97 R1- 1907509, Reno, NV, USA, May 13-17, 2019.

Zte, "Discussion on NR positioning signals", 3GPP TSG RAN WG1 Meeting #96bis, R1-1903901, Xi'an, China, April, 8-12, 2019.

Samsung, "Remaining details on SRS", 3GPP TSG RAN WG1 Meeting 91 R1- 1720313, Reno, USA, Nov. 27-Dec. 1, 2017.

United Kingdom Intellectual Property Office Search Report dated Jan. 13, 2020, issued in United Kingdom Application No. GB1911341.4.

International Search Report dated Oct. 27, 2020, Issued in International application No. PCT/KR2020/010232.

Huawei et al. "Potential techniques for NR positioning," 3GPP TSG RAN, WG1, Meeting #95, Reno, R1-1812236, Spokane, USA, Nov. 12-16, 2018.

Ericsson "Offline session1, notes for NR Positioning AI-7.2.10.1 DL and UL Reference Signals for NR Positioning (UL part)," 3GPP TSG RAN WG1 Meeting#96bis, R1-1905751, Xi'an China, Apr. 8-12, 2019.

Sony "Summary of SRS," 3GPP, TSG RAN, WG1, meeting 91, R1-1721683, Reno USA, Nov. 27-Dec. 1, 2017.

European Search Report dated Jun. 24, 2022, issued in European Application No. EP 20 84 9735.4.

Nokia et al., SRS transmission for beam management, R1-1711290, 3GPP TSG RAN WG1 NR Ad-Hoc#2, Jun. 17, 2017, Qingdao, P.R. China.

Chinese Notice of Allowance dated May 31, 2024, issued in Chinese Application No. 202080056486.4.

* cited by examiner

[Fig. 1]

| μ | Δf=$2^μ$·15 kHz | Cyclic Prefix |
|---|---|---|
| 0 | 15 kHz | Normal |
| 1 | 30 kHz | Normal |
| 2 | 60 kHz | Normal, Extended |
| 3 | 120 kHz | Normal |
| 4 | 240 kHz | Normal |
| 5 | 480 kHz | Normal |

Data < 6 GHz (μ = 0, 1)
Data >6 GHz (μ = 2, 3)
← Specified but not supported

APPARATUS AND METHOD FOR POSITIONING IN WIRELESS COMMUNICATION SYSTEM

TECHNICAL FIELD

The present disclosure relates to Uplink Time Delay of Arrival (UTDoA) in a wireless communication system.

BACKGROUND ART

To meet the demand due to ever-increasing wireless data traffic after the commercialization of 4th generation (4G) communication system, there have been efforts to develop an advanced 5th generation (5G) system or pre-5G communication system. For this reason, a 5G or pre-5G communication system is also called a beyond 4th-generation (4G) network communication system or post long term evolution (LTE) system. Implementation of a 5G communication system using ultra-frequency millimeter wave (mmWave) bands, e.g., 60 giga hertz (GHz) bands, has been considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in 5G communication systems. In addition, in 5G systems, an advanced coding modulation (ACM), e.g., hybrid frequency-shift keying (FSK) and quadrature amplitude modulation (QAM) (FQAM), sliding window super-position coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as objects transmit, receive and process information without human intervention. Internet of Everything (IoE) technologies combined with IoT, such as big data processing technologies through connection with a cloud server, for example, have also emerged. To implement IoT, various technologies, such as sensing technologies, wired/wireless communication and network infrastructure, service interfacing technologies, and security technologies are required, and recently, even technologies for sensor network, Machine to Machine (M2M), Machine Type Communication (MTC) for connection between objects are being studied. Such an IoT environment may provide intelligent Internet Technology (IT) services that generate new value in human life by collecting and analyzing data generated among connected objects. IoT may be applied to a variety of areas, such as smart homes, smart buildings, smart cities, smart cars or connected cars, smart grids, health care, smart home appliances and advanced medical services through convergence and combination between existing Information Technologies (IT) and various industrial applications.

In this regard, various attempts to apply 5G communication systems to the IoT network are being made. For example, technologies for a sensor network, M2M, MTC, etc., are implemented by 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

As described above, various services can be provided according to the development of a wireless communication system, and thus a method for easily providing such services is required.

DISCLOSURE OF INVENTION

Solution to Problem

The present disclosure relates to an apparatus and a method for generating Sound Reference Signal (SRS) based on UTDoA for performing positioning of a terminal.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

MODE FOR THE INVENTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list. Throughout the disclosure, the expression "at least one of a, b or c" indicates only a, only b, only c, both a and b, both a and c, both b and c, all of a, b, and c, or variations thereof. Advantages and features of one or more embodiments of the disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor. In the disclosure, a controller may also be referred to as a processor.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16e. 5th generation (5G) or new radio (NR) communication standards are being developed with 5G wireless communication systems.

Hereinafter, one or more embodiments will be described with reference to accompanying drawings. Also, in the description of the disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a base station may be a subject performing resource assignment of a terminal, and may be at least one of a gNode B, an eNode B, a Node B, a base station (BS), a wireless access unit, a base station controller, and a node on a network. A terminal may include user equipment (UE), a mobile station (MS), a cellular phone, a smart phone, a computer, a multimedia system capable of performing communication functions, or the like. In the disclosure, a DL is a wireless transmission path of a signal transmitted from a base station to a terminal, and a UL is a wireless transmission path of a signal transmitted from a terminal to a base station. Throughout the specification, a layer (or a layer apparatus) may also be referred to as an entity. Also, hereinbelow, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure according to a person skilled in the art.

In an LTE system as a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

Terms such as a physical channel and a signal in an existing LTE or LTE-A system may be used to describe methods and apparatuses suggested in the disclosure. However, the content of the disclosure is applied to a wireless communication system, instead of the LTE or LTE-A system.

According to an embodiment of the present disclosure, a first base station serving a terminal is provided. The first base station may comprise: a transceiver; and at least one processor. The at least one processor may generate a control signal associated with Sounding Reference Signal (SRS) for positioning of the terminal based on a first sub-carrier spacing and one or more sub-carrier spacings for the first base station and one or more second base stations, respectively. The at least one processor may control the terminal to repeat a pattern of the SRS in consecutive slots by transmitting the generated control signal to the terminal via the transceiver. The at least one processor may perform the positioning of the terminal based on time when the first base station and the one or more second base stations receive transmissions for the SRS.

In an embodiment, the at least one processor may determine, among the one or more second sub-carrier spacings, one or more third sub-carrier spacings that are smaller than the first sub-carrier spacing. The at least one processor may determine one or more third base stations corresponding to the one or more third sub-carrier spacings, respectively. The at least one processor may determine a ratio associated with the first sub-carrier spacing and the one or more third sub-carrier spacings by dividing the first sub-carrier spacing by the smallest sub-carrier spacing among the one or more third sub-carrier spacings.

In an embodiment, the at least one processor may control the terminal to repeat the pattern of the SRS as many times as the determined ratio in the consecutive slots.

In an embodiment, the one or more second base stations may be located less than a predetermined distance from the terminal.

In an embodiment, the sub-carrier of the first based station may be the same as a sub-carrier of the terminal.

According to an embodiment of the present disclosure, a terminal in a wireless communication system is provided. The terminal may comprise: a transceiver; and at least one processor. The at least one processor may receive, from a first base station, a control signal generated based on a first sub-carrier spacing and one or more second sub-carrier spacings for the first base station and one or more second base stations, respectively, via the transceiver. The at least one processor may repeat a pattern of a Sounding Reference Signal (SRS) for a positioning of the terminal in consecutive slots based on the control signal. The at least one processor may transmit, the SRS with the repeated pattern to the first base station and the one or more second base stations via the transceiver.

In an embodiment, the control signal may comprise: information regarding one or more third sub-carrier spacings that are smaller than the first sub-carrier spacing among the one or more second sub-carrier spacings; information regarding one or more third base stations corresponding to the one or more third sub-carrier spacings, respectively; and information regarding a ratio associated with the first sub-carrier spacing and the one or more third sub-carrier spacings, wherein the ratio is determined by dividing the first sub-carrier spacing by the smallest sub-carrier spacing among the one or more third sub-carrier spacings.

In an embodiment, the at least one processor may repeat the pattern of the SRS as many times as the determined ratio in the consecutive slots based on the control signal.

In an embodiment, the one or more second base stations may be located less than a predetermined distance from the terminal.

According to an embodiment of the present disclosure, a method for a first base station serving a terminal in a wireless communication system is provided. The method may comprise: generating a control signal associated with a Sounding Reference Signal (SRS) for positioning of the terminal based on a first sub-carrier spacing and one or more second sub-carrier spacings for the first base station and one or more second base stations, respectively; controlling the terminal to repeat a pattern of the SRS in consecutive slots by transmitting the generated control signal to the terminal; and performing the positioning of the terminal based on times when the first base station and the one or more second base stations receive transmissions for the SRS.

In an embodiment, the generating of the control signal may comprise: determining, among the one or more second sub-carrier spacings, one or more third sub-carrier spacings that are smaller than the first sub-carrier spacing; determining one or more third base stations corresponding to the one or more third sub-carrier spacings, respectively; and determining a ratio associated with the first sub-carrier spacing and the one or more third sub-carrier spacings by dividing the first sub-carrier spacing by the smallest sub-carrier spacing among the one or more third sub-carrier spacings.

In an embodiment, the controlling of the terminal to repeat the pattern of the SRS in the consecutive slots may comprise controlling the terminal to repeat the pattern of the SRS as many times as the determined ratio in the consecutive slots.

In an embodiment, the one or more second base stations may be located less than a predetermined distance from the terminal.

According to an embodiment of the present disclosure, a method for a terminal served by a first base station in a wireless communication system is provided. The method may comprise: receiving, from a first base station, a control signal generated based on a first sub-carrier spacing and one or more second sub-carrier spacings for the first base station and one or more second base stations, respectively; repeating a pattern of a Sounding Reference Signal (SRS) for positioning of the terminal in consecutive slots based on the control signal; and transmitting the SRS with the repeated pattern to the first base station and the second base stations.

In an embodiment, the control signal may comprise: information regarding one or more third sub-carrier spacings that are smaller than the first sub-carrier spacing among the one or more second sub-carrier spacings; information regarding one or more third base stations corresponding to the one or more third sub-carrier spacings, respectively; information regarding a ratio associated with the first sub-carrier spacing and the one or more third sub-carrier spacings, wherein the ratio is determined by dividing the first sub-carrier spacing by the smallest sub-carrier spacing among the one or more third sub-carrier spacings.

In an embodiment, the repeating of the pattern of the SRS for the positioning of the terminal in the consecutive slots may comprise: repeating the pattern of the SRS as many times as the determined ratio in the consecutive slots based on the control signal.

The present disclosure is related to Uplink Time Delay of Arrival (UTDoA) in a wireless communication system. Particularly, the present disclosure is related to User Equipment (UE) positioning in a Fifth Generation (5G) or New Radio (NR) network, but embodiments herein can have application in other telecommunication networks also.

UTDoA is known to provide UE positioning, based on a difference in arrival times of certain transmissions from a UE by at least three Base Stations (gNB). For example, UE may transmit uplink signals to a plurality of gNBs simultaneously, and UTDoA may be determined based on times when the plurality of gNBs receive the transmitted uplink signals from the UE, For example, UE positioning may indicate an operation of estimating a position of the UE by a serving gNB.

A problem with implementing such a system in 5G networks arises due to the different possible Sub Carrier Spacing (SCS) which can be used by neighbouring gNBs. Selectively, the neighbouring gNBs may be located less than a predetermined distance from the UE This, in effect, means that the total power received by a particular gNB may be significantly less than a neighbouring gNB operating using a different SCS or numerology.

For example, when a first neighbouring gNB is the serving gNB, a first SCS of the first neighbouring gNB may be the same as a SCS of the UE and a second neighbouring gNB may apply smaller SCS than the first SCS. In this case, a sampling clock rate of the first neighbouring gNB may be faster than a sampling clock rate of the second neighbour gNB. Therefore, when the UE simultaneously transmits uplink signals for UE positioning to the first neighbouring gNB and the second neighbouring gNB, power received by the second neighbouring gNB from an uplink signal may be less than power received by the first neighbouring gNB from an uplink signal.

According to a first aspect of the present disclosure, there is provided a method of operating a first base station, gNB, the first gNB acting as a serving gNB to a User Equipment, UE, and being in communication with a plurality of neighbouring gNBs, comprising the steps of: a) the first gNB requesting from the UE, signal strength measurements of the plurality of neighbouring gNBs; b) the first gNB selecting a sub-set of the plurality of neighbouring gNBs having the highest reported signal strengths in relation to the UE; c) determining if one or more of the sub-set of gNBs is operating with a lower Sub-Carrier Spacing, SCS, than the first gNB and, if so determined, the first gNB instructing the UE to repeat its Sounding Reference Signal, SRS, so that it is available in $2^\mu$ subsequent slots, wherein $\mu$ is defined such that the SCS of the first gNB is $2^\mu$ times the lowest SCS of the sub-set of neighbouring gNBs.

In an embodiment, if the SRS is not detected by all the gNBs of the sub-set, the first gNB instructs the UE to repeat the SRS a further $2^\mu$ times.

In an embodiment, the first gNB instructs the sub-set of neighbouring gNBs that the SRS will be transmitted to cover a total of $2^\mu$ consecutive time slots.

In an embodiment, if the SRS is not detected by all the gNBs of the sub-set after being transmitted a further $2^\mu$ times, then the first gNB begins the method again from step b) with a new sub-set.

In an embodiment, the serving gNB collects UTDOA data from the sub-set and completes a positioning process on the basis of the collected UTDOA data.

According to a second aspect of the present disclosure, there is provided a gNB arranged to perform the method of the first aspect.

According to a third aspect of the present disclosure, there is provided a method of operating a User Equipment, UE, in communication with a serving base station, gNB, and a plurality of neighbouring gNBs, comprising the step of: receiving an instruction from the serving gNB to repeat its Sounding Reference Signal, SRS, so that it is available in $2^\mu$ subsequent slots, wherein $\mu$ is defined such that the SCS of the first gNB is $2^\mu$ times the lowest SCS of the sub-set of neighbouring gNBs.

According to a fourth aspect of the present disclosure, there is provided a UE arranged to perform the method of the third aspect.

Embodiments of the present disclosure utilise an adaptation of the configuration of the Sounding Reference Signal (SRS) for UTDOA based positioning. In an embodiment, the network has timing information from multiple gNBs for the received SRS which is transmitted from a given UE. An issue is the hearability of this SRS signal for the neighbouring gNBs. This is particularly acute when neighbouring cells employ different sub-carrier spacings, meaning that the sampling times of their clocks is different, leading to a reduction in the amount of energy that can be captured from the UE's SRS transmission.

Embodiments of the disclosure adapt the SRS configuration to densify SRS in the time domain, by repeating it in consecutive slots, which enables neighbouring gNBs to maximize the energy captured from sampling the SRS signal from the said UE, even when they are operating with different SCS.

The Sounding reference signal (SRS) is specified in 5G-NR release 15, for the purposes of uplink beam training codebook/non-codebook based pre-coder selection and channel state acquisition (CSI). All these activities are carried out within the serving cell i.e. the gNB with which the UE is communicating. It has been agreed to utilise SRS for Uplink (UL) positioning as staggered patterns of comb size {2,4,8}, with additional comb sizes {1,6,12} considered for further study.

The UE is obliged to use power control (so only the serving gNB receives the UE signal in an adequate level) to control inter-cell interference. Therefore, simply increasing the SRS transmit power is not an option, since this adversely affect neighbouring cells and reduce UE battery life.

Embodiments of the disclosure increase the received signal power of SRS, in the case of neighbouring cells applying different SCS. SRS is now accepted as a main signal to be used in UL positioning and hence its proper detection by multiple neighbour cells is required. Multiple SCS are specified by Release 15 as applicable in different cells and/or different bandwidth parts (BWP) and so embodiments of the disclosure address this issue.

Embodiments of the disclosure provide a method to configure the SRS (Sounding Reference Signal) for UTDOA based positioning support, when neighbouring cells employ different numerologies, in the form of different sub-carrier spacings (SCS). The SRS signal from the UE needs to be read by a number of neighbouring gNBs and with uplink power control in place, there are limitations on the hearability of this signal.

When a serving gNB and the UE employ a higher SCS, the respective SRS slot times are shorter and the neighbouring gNBs with lower SCS face further restrictions on the amount of power they can capture from the SRS transmitted by the UE using a higher SCS.

Embodiments of the disclosure repeat the SRS comb-N pattern in adjacent slots of the higher SCS UE transmission to fit to a lower SCS neighbour gNB slot time, to mitigate this effect.

Although a few preferred embodiments of the present disclosure have been shown and described, it will be appreciated by those skilled in the art that various changes and modifications might be made without departing from the scope of the invention, as defined in the appended claims.

The Sounding Reference Signal (SRS) is identified as the main uplink signal to enact UTDOA based positioning methods. The SRS is currently specified in Release 15, as a signal for multiple usages within the serving cell of the UE. With uplink power control in operation, the UE can only transmit with a signal power adequate to be heard by its own serving gNB, and takes no account of the need for neighbouring gNBs to receive the signal.

However for UTDOA based positioning, multiple neighbouring gNBs need to receive and decode this signal. Simple power increment of the SRS is not an option for the aforementioned reasons.

Figure 1:
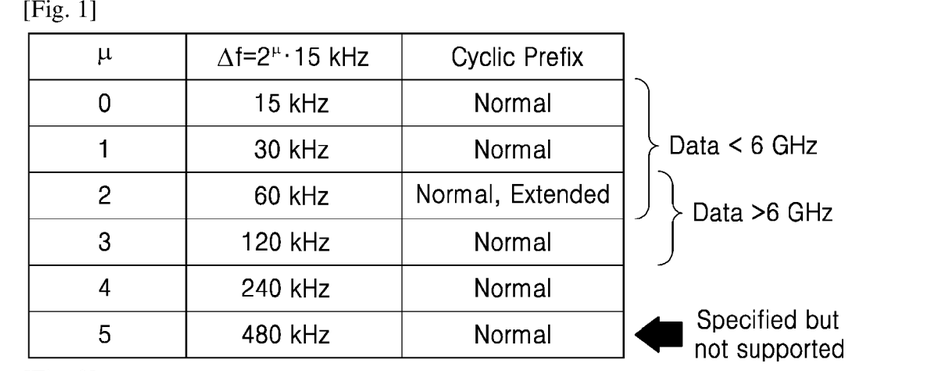
FIG. 1 illustrates a table showing Sub Carrier Spacings at different frequency ranges.

FIG. 1 illustrates a table showing Sub Carrier Spacings at different frequency ranges. The default sub-carrier spacing is 15 kHz, derived from the LTE system. For 5G-NR, several other sub-carrier spacings are specified, as multiples of 15 kHz. This can be denoted as $15 \times 2^\mu$ kHz, with $\mu=\{1, 2, 3, 젤\}$. FIG. 1 shows a table illustrating the applicable SCS, for both the frequency ranges FR1 (<6 GHz) and FR2 (>6 GHz).

For example, SCS of 15 kHz, 30 kHz, and 60 kHz may be supported in frequency range FR1 and SCS of 60 kHz, 120 kHz and 240 kHz may be supported in frequency range FR2. SCS of 480 kHz is specified in Release 15, but not supported.

With increasing SCS, the symbol and slot lengths of a numerology reduces and the sampling clock rate correspondingly increases. With the SRS patterns currently proposed or used, it is agreed that comb-N patterns spanning a number of symbols in a given slot should be adapted. For pre-FFT based SRS signal capture and when all gNBs use the same SCS, the number of SRS sampling points (and hence the captured SRS energy) remains the same. Therefore, increasing the SCS in all of the neighbour cells would not cause an additional issue with the reduced symbol and slot lengths as the sampling clock rates also change correspondingly.

The SRS low hearability issue is pronounced when neighbouring gNBs (or certain of the Bandwidth parts (BWP)) are configured to use different SCS. If the UE and the serving gNB use a higher SCS and one (or some) of the neighbouring gNBs use a lower SCS, the slot lengths in reading the UE SRS will appear as $2^\mu$ times shorter for this neighbouring gNB. As this neighbouring gNB will use a sampling clock related to its lower SCS, the captured energy from the SRS signal will be $2^\mu$ times less, compared to a scenario when the UE SRS spans the whole of the neighbouring gNB's slot length.

Figure 2:
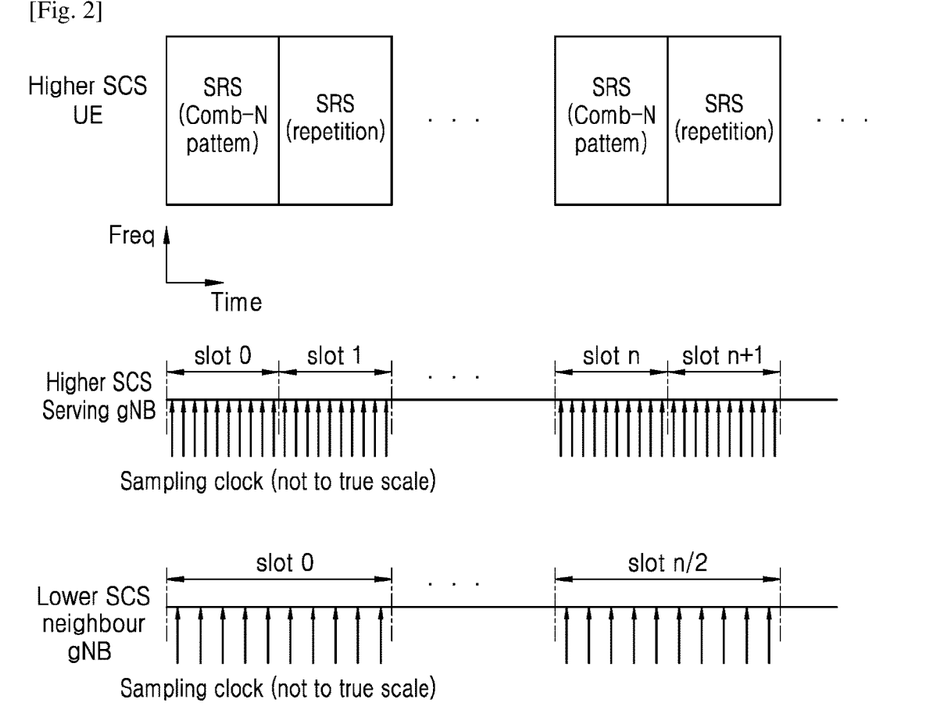
FIG. 2 illustrates SRS repetition according to an embodiment of the present disclosure.

Embodiments of the disclosure provide for the UE (with the higher SCS) to repeat the SRS comb-N pattern, so SRS is available in $2^\mu$ consecutive slots, where the parameter $2^\mu$ gives the ratio of the UE's (and serving gNB's) higher SCS to the lower SCS of the neighbouring gNB. In a scenario where the neighbouring gNBs utilize multiple SCS values, the ratio will be configured from the UE's higher SCS to the lowest SCS of all of the neighbouring gNBs. The solution is illustrated in FIG. 2, for the case where the SCS ratio of the higher SCS UE (and the serving gNB) to the lower SCS neighbour gNB is 2 (i.e. $\mu=1$). Different values of $\mu$ are merely scaled versions of the scenario illustrated in FIG. 2.

As can be seen in FIG. 2, the repetition allows the lower SCS gNB to effectively capture samples spanning the length of its own slot time, thereby increasing the hearability of this signal. With the repetition of the same Comb-N pattern, the additional signalling (on the X2 interface) among the respective gNBs, and from the serving gNB to the respective UE is minimized.

The serving gNB regularly requests neighbouring cell signal strength measurements from the active UEs in its cell for handover purposes. These measurements can be utilized, for example, by the serving gNB to determine a set of neighbouring gNBs it can utilize to carry out positioning of a certain UE. In this scenario, if one (or some) of the neighbouring gNBs utilize a lower SCS, which is lower by a factor of $2^\mu$, the serving gNB can request the particular UE to repeat the SRS pattern, so that SRS is available in $2^\mu$ subsequent slots, to thereby increase the amount of power the lower SCS neighbouring gNBs can capture from the SCS.

In an extreme scenario, where the neighbouring gNBs still do not capture enough power to detect the SRS properly, the serving gNB can request the UE to repeat the SRS another $2^\mu$ times. The overall procedure is depicted in the flow chart in FIG. 3.

Figure 3:
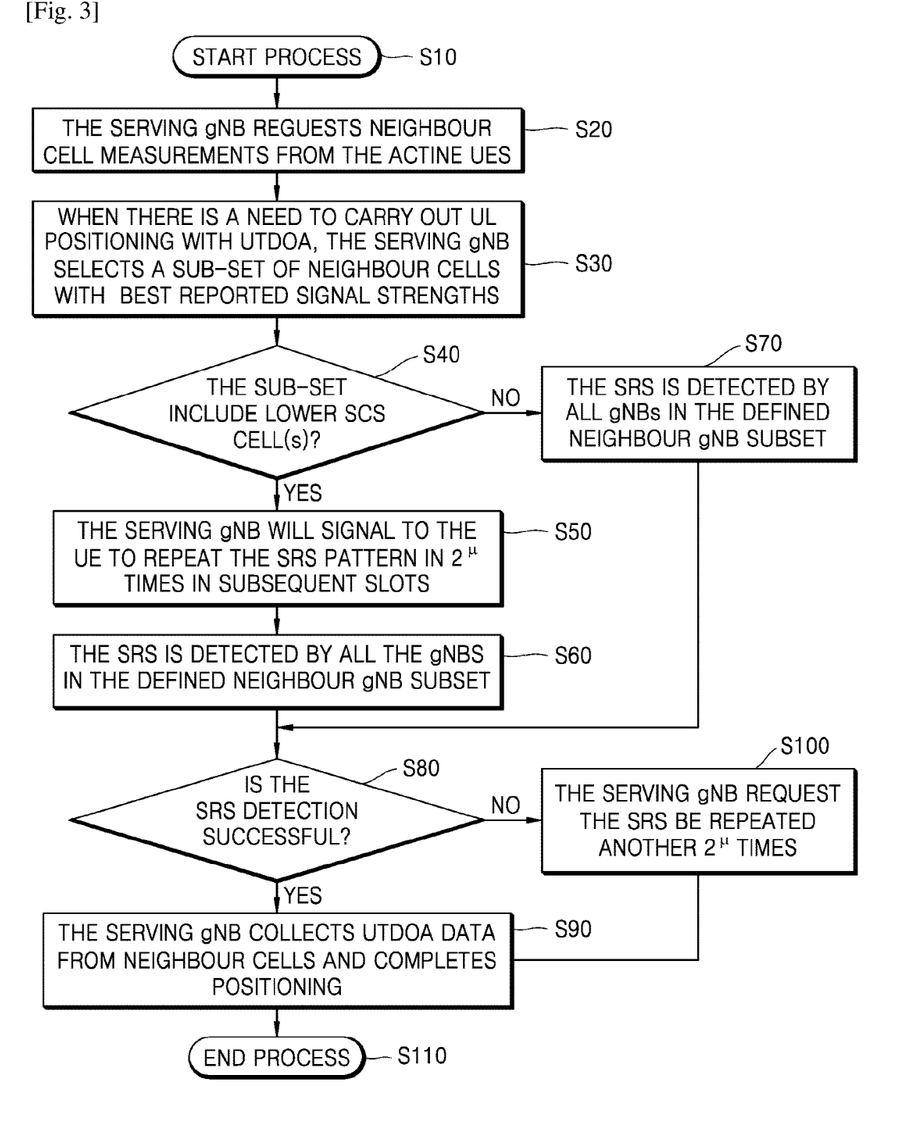
FIG. 3 illustrates a flowchart of a method according to an embodiment of the present disclosure.

Flow begins at S10. At S20, the serving gNB requests measurements of neighbouring cell(s) from the active UE(s) in its cell. For example, the serving gNB may periodically request for the measurements of the neighbouring cells from the active UE.

At S30, the serving gNB determines if there is a need to carry out UL positioning on a UE and selects a subset of neighbouring cells having the best reported signal strengths (from S20). For example, the serving gNB may sort the neighbouring gNBs in a descending order of values of the reported signal strengths and detect a predetermined number of neighbouring gNBs among the sorted neighbouring gNBs. The serving gNB may select the subset including the detected neighbouring gNBs.

At S40, the serving gNB determines whether any of the subset includes gNBs operating on lower SCS. This information will be available in the system parameters of the particular gNB.

If the neighbouring gNBs in the subset are all operating with the same or higher SCS, then flow passes to S70 and the SRS is detected by all gNBs in the defined subset without any requirement for the UE to change its normal SRS transmission. From here, flow continues to S80.

If the result of the determination at S40 is that one or more of the gNBs in the subset is operable with lower SCS, then at S50, the serving gNB instructs the UE to repeat its SRS pattern to fill $2^\mu$ consecutive slots.

At S60, the neighbouring gNBs in the subset detect SRS (as repeated in subsequent slots).

At S80, the gNBs in the subset determine if the SRS has been successfully detected and signal this to the serving gNB via X2.

If the SRS detection is not successful for one or more of the subset, then at S100, the serving gNB requests the SRS signal to be transmitted a further $2^\mu$ times by the UE. Flow then continues to S90.

If this repeated transmission of SRS in multiple slots is not effective, then the serving gNB may select a new subset of neighbouring gNBs in an attempt to successfully complete the positioning process. In such a case, flow starts again at S10.

If the SRS detection is determined to be successful at S80, then at S90 the serving gNB collects UTDOA data from the subset of neighbouring cells and completes the positioning process. The determined position of the UE may then be utilised as required and in the known way. At S110, the process ends.

As a special case of the above process, the SRS repetition can be performed for a situation where the neighbouring gNB sub-set has the same SCS, yet some of the gNBs do not receive the SRS with sufficient power to detect the signal. In other words, even if the determination at S40 is that there are no lower SCS cells in the subset, step S50 can be activated to give neighbouring gNBs more chance of detecting SRS.

By means of embodiments of the present disclosure, it is possible to mitigate the effect of SCS differences between neighbouring gNBs, thereby allowing more reliable positioning performance by means of UTDOA.

Figure 4:
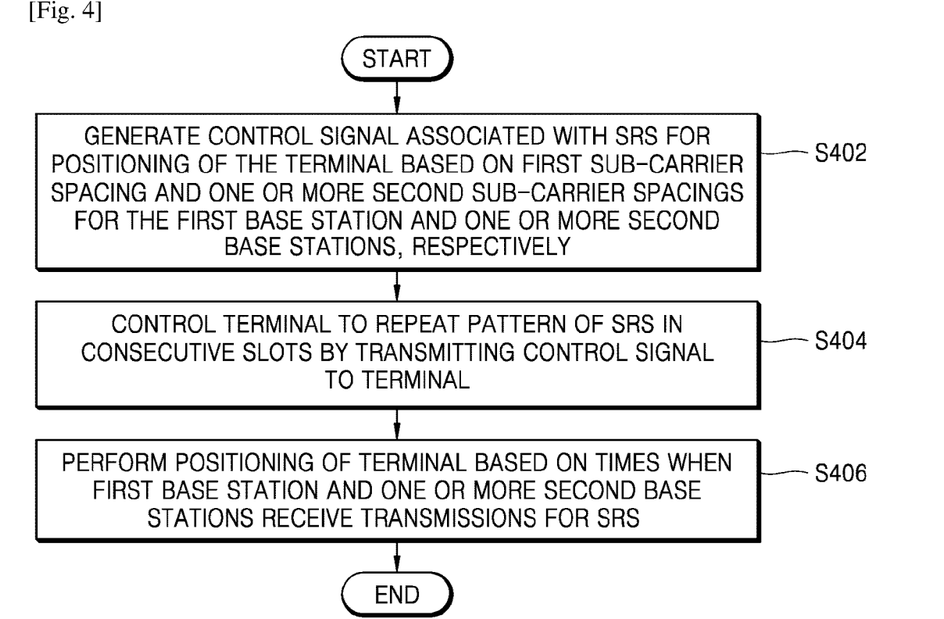
FIG. 4 illustrates a flowchart showing an operation of a first base station according to an embodiment of the present disclosure.

FIG. 4 illustrates a flowchart showing an operation of a first base station according to an embodiment of the present disclosure.

In step S402, the first base station serving a terminal may generate a control signal associated with a Sounding Reference Signal (SRS) for positioning of the terminal based on a first sub-carrier spacing and one or more second sub-carrier spacings for the first base station and one or more second base stations, respectively. For example, the one or more second base stations may be located less than a predetermined distance from the terminal. Specifically, the first sub-carrier spacing and a sub-carrier spacing of the terminal may be the same.

Specifically, the first base station may determine, among the one or more second sub-carrier spacings, one or more third sub-carrier spacings that are smaller than the first sub-carrier spacing. The first base station may determine one or more third base stations corresponding to the one or more third sub-carrier spacings, respectively. The first base station may determine a ratio associated with the first sub-carrier spacing and the one or more third sub-carrier spacings by dividing the first sub-carrier spacing by the smallest sub-carrier spacing among the one or more third sub-carrier spacings. Selectively, the pattern of the SRS may include Comb-N pattern.

In step S404, the first base station may control the terminal to repeat the pattern of the SRS in the consecutive slots by transmitting the control signal generated in step 402 to the terminal. For example, the first base station may control the terminal to repeat the pattern of the SRS as many times as the determined ratio in the consecutive slots. The terminal may transmit the SRS generated by repeating the pattern of the SRS based on the control signal to the first base station and the one or more second base stations.

In step S406, the first base station may perform the positioning of the terminal based on times when the first base station and the one or more second base stations receive transmissions for the SRS. According an embodiment of the present disclosure, the first base station may control the terminal to repeat the pattern of the SRS so that the one or more second base stations may receive the SRS from the terminal without experiencing a loss in received power even if the one or more second sub-carrier spacings are smaller than the first sub-carrier spacing. Accordingly, the first base station may perform the positioning of the terminal based on times when the first base station and the one or more second base stations receive the transmissions for the SRS from the terminal.

Figure 5:
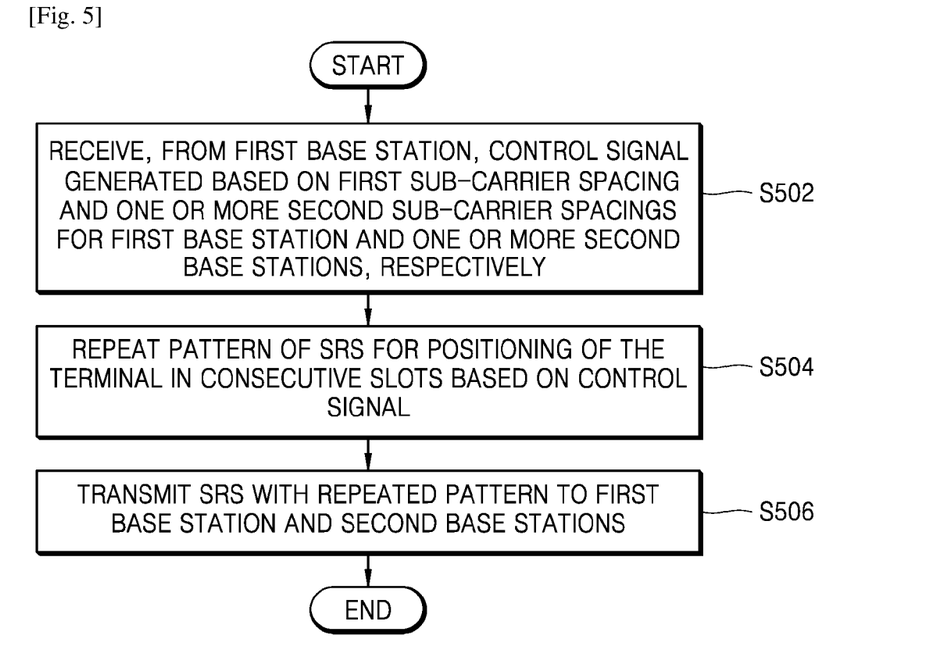
FIG. 5 illustrates a flowchart showing an operation of a terminal according to an embodiment of the present disclosure.

FIG. 5 illustrates a flowchart showing an operation of a terminal according to an embodiment of the present disclosure.

In step S502, the terminal may receive, from a first base station, a control signal generated based on a first sub-carrier spacing and one or more second sub-carrier spacings for the first base station and one or more second base stations, respectively. Selectively, a sub-carrier spacing of the terminal and the first sub-carrier spacing may be the same.

Specifically, the control signal may comprise: information regarding one or more third sub-carrier spacings that are smaller than the first sub-carrier spacing among the one or more second sub-carrier spacings; information regarding one or more third base stations corresponding to the one or more third sub-carrier spacings, respectively; and information regarding a ratio associated with the first sub-carrier spacing and the one or more third sub-carrier spacings. The ratio may be determined by dividing the first sub-carrier spacing by the smallest sub-carrier spacing among the one or more third sub-carrier spacings.

In step S504, the terminal may repeat the pattern of the SRS for the positioning of the terminal in the consecutive slots based on the control signal. For example, the terminal may repeat the pattern of the SRS as many times as the ratio associated with the first sub-carrier spacing and the one or more third sub-carrier spacings in the consecutive slots based on the control signal. Selectively, the pattern of the SRS may include a Comb-N pattern.

In step S506, the terminal may transmit the SRS with the repeated pattern to the first base station and the one or more second base stations.

Figure 6:
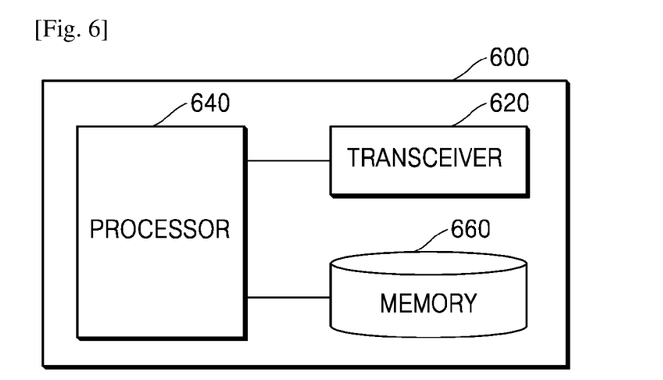
FIG. 6 illustrates a block diagram of a first base station according to an embodiment of the present disclosure.

FIG. 6 illustrates a block diagram of a first base station according to an embodiment of the present disclosure.

Referring to FIG. 6, the first base station 600 may include a transceiver 620, a processor 640 and a memory 660. However, not all of the illustrated components are essential. The first base station 600 may be implemented by more or less components than those illustrated in FIG. 6. In addition, the transceiver 620, the processor 640 and the memory 660 may be implemented as a single chip according to another embodiment.

In an embodiment, the transceiver 620 may transmit and/or receive a signal to/from a terminal or second base stations or other electric devices connected with the first base station 600 by wired connection or wirelessly. The signal may include control information and data. For example, the transceiver 620 may transmit, to the terminal, a control signal for controlling the terminal to repeat a pattern of an SRS in consecutive slots and receive, from the terminal, the SRS with the repeated pattern for performing positioning of the terminal.

In an embodiment, the processor 640 may control overall operation of the first base station 600 and may include at least one processor such as CPU or GPU. For example, the processor 640 may execute a program stored in the memory 660 or read a stored file or store a new file in the memory 660. In an embodiment, the processor 640 may perform an operation to operate the first base station 600 by executing the program stored in the memory 660. For example, the processor 640 may generate a control signal for controlling the terminal to repeat the pattern of the SRS in the consecutive slots based on a first sub-carrier spacing and one or more second sub-carrier spacings for the first base station 600 and the one or more second base stations, respectively. For example, the one or more second base stations may be located less than a predetermined distance from the terminal.

The memory 660 may store various kinds of data such as a program, files, an application, or the like. The processor 640 may use the data stored in the memory 660 by accessing the data stored in the memory 660 or may store new data in the memory 660. In an embodiment, the memory 660 may store information for generating the control signal.

Figure 7:
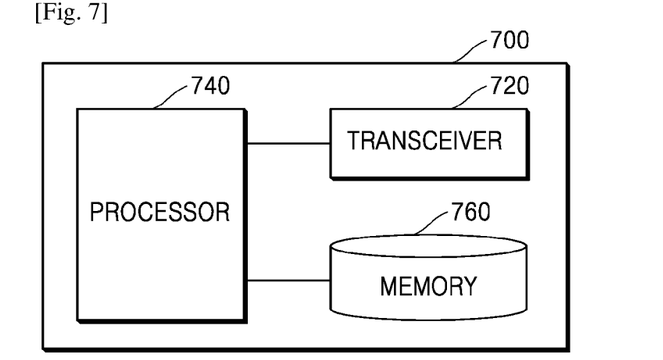
FIG. 7 illustrates a block diagram of a terminal according to an embodiment of the present disclosure.

FIG. 7 illustrates a block diagram of a terminal according to an embodiment of the present disclosure.

Referring to the FIG. 7, the terminal 700 may include a transceiver 720, a processor 740 and a memory 760. However, not all of the illustrated components are essential. The terminal 700 may be implemented by more or less components than those illustrated in FIG. 7. In addition, the transceiver 720, the processor 740 and the memory 760 may be implemented as a single chip according to another embodiment.

The transceiver 720 may transmit and/or receive a signal to/from a first base station 600 or second base stations located less than a predetermined distance from the terminal 700 or another electric device connected to the terminal 700 by a wired connection or wirelessly. The signal may include control information and data. For example, the transceiver 720 may receive a control signal for repeating a pattern of an SRS. The transceiver 720 may transmit the SRS with the repeated pattern for positioning of the terminal 700 to the first base station 600 and the one or more second base stations.

In an embodiment, the processor 740 may control overall operation of the terminal 700. The processor 704 may control other components included in the terminal 700 to perform an operation for operating the terminal 700. For example, the processor 740 may execute a program stored in the memory 760 or read a stored file or store a new file in the memory 760. In an embodiment, the processor 740 may perform an operation to operate the terminal 700 by executing the program stored in the memory 760. For example, the processor 740 may repeat the pattern of the SRS for the positioning of the terminal 700 in the consecutive slots based on the control signal.

The memory 760 may store various kinds of data such as a program, a file, an application, or the like. The processor 740 may use the data stored in the memory 760 by accessing the data stored in the memory 760 or may store new data in the memory 760. In an embodiment, the memory 760 may store information associated with the control signal.

Methods according to embodiments of the disclosure described in claims or specification of the disclosure may be implemented as hardware, software, or a combination of hardware and software.

Figure 8:
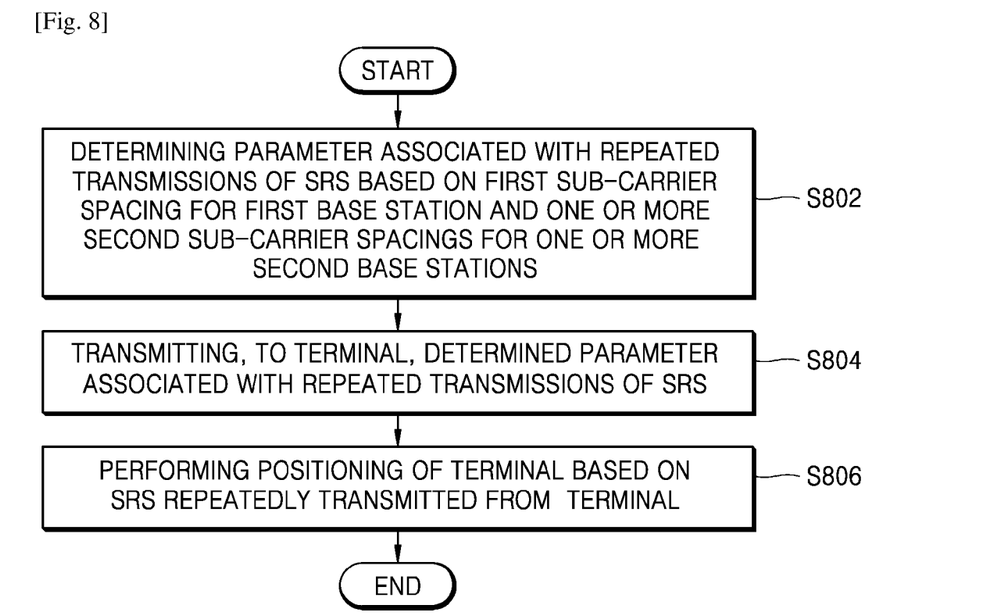
FIG. 8 illustrates a flowchart showing an operation of a first base station according to another embodiment of the present disclosure.

FIG. 8 illustrates a flowchart showing an operation of a first base station according to another embodiment of the present disclosure.

In step S802, the first base station may determine a parameter associated with repeated transmissions of a sounding reference signal (SRS) based on a first sub-carrier spacing for the first base station and one or more second sub-carrier spacings for one or more second base stations. For example, the parameter may comprise a comb value associated with the SRS. For example, the first sub-carrier spacing and the one or more second sub-carrier spacings may correspond to a first bandwidth part and one or more second bandwidth parts, respectively.

Specifically, the first base station may determine, among the one or more second sub-carrier spacings, one or more third sub-carrier spacings that are smaller than the first sub-carrier spacing. The first base station may determine a ratio associated with the first sub-carrier spacing and the determined one or more third sub-carrier spacings by dividing the first sub-carrier spacing by the smallest sub-carrier spacing among the one or more third sub-carrier spacings.

In step S804, the first base station may transmit, to a terminal, the determined parameter associated with the repeated transmissions of the SRS.

In step S806, the first base station may perform positioning of the terminal based on the SRS repeatedly transmitted from the terminal. For example, the first base station may perform the positioning of the terminal based on UTDoA data determined based on transmissions of SRS from the terminal to the first base station and the one or more second base stations.

Figure 9:
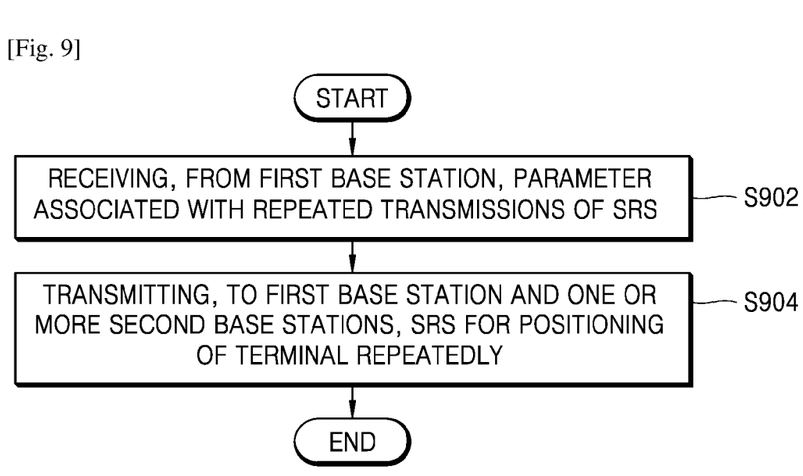
FIG. 9 illustrates a flowchart showing an operation of a terminal according to another embodiment of the present disclosure.

FIG. 9 illustrates a flowchart showing an operation of a terminal according to another embodiment of the present disclosure.

In step S902, the terminal may receive a parameter associated with repeated transmissions of a sounding reference signal (SRS) from a first base station. For example, the parameter may be determined based on a first sub-carrier spacing for the first base station and one or more second sub-carrier spacings for the one or more second base stations. For example, the parameter may comprise a comb value associated with the SRS. For example, the first sub-carrier spacing and the one or more second sub-carrier spacings may correspond to a first bandwidth part and one or more second bandwidth parts, respectively.

In step S904, the terminal may transmit the SRS for positioning of the terminal repeatedly to the first base station and one or more second base stations.

When implemented as software, a computer-readable storage medium or computer program product storing at least one program (software module) may be provided. The at least one program stored in the computer-readable storage medium or computer program product is configured to be executable by one or more processors in an electronic device. The one or more processors include instructions causing the electronic device to execute the methods according to embodiments of the disclosure described in the claims or the specification of the disclosure.

The at least one program (the software module, the software) may be stored in a non-volatile memory including a random-access memory (RAM) and a flash memory, a read-only memory (ROM), an electrically erasable programmable read-only memory (EEPROM), a magnetic disc storage device, a Compact Disc-ROM (CD-ROM), Digital Versatile Discs (DVDs), other optical storage devices, a magnetic cassette, or the like, or a memory configured with any or all combinations thereof. Also, each of the configured memories may be provided in a multiple number.

The at least one program may be stored in an attachable storage device that can be accessed via a communication network including the Internet, an Intranet, a local area network (LAN), a wide LAN (WLAN), or a storage area network (SAN), or a combination thereof. The storage device may access, via an external port, an apparatus for performing embodiments of the disclosure. Also, a separate storage device on a communication network may access the apparatus for performing embodiments of the disclosure.

In the aforementioned embodiments of the disclosure, each element included in the disclosure is expressed in a singular form or a plural form according to the embodiments of the disclosure. However, for convenience of description, the expression in the singular form or the plural form is selected to be appropriate for a provided situation, and thus, the disclosure is not limited to the singular form or the plural form. Accordingly, even when an element is expressed in a plural form, the element may be configured in a singular form, and even when an element is expressed in a singular form, the element may be configured in a plural form.

While one or more embodiments of the disclosure have been described above with reference to the drawings, the embodiments of the disclosure are for the purpose of facilitating understanding of the disclosure only and are not intended to be limiting of the disclosure. That is, it will be understood by those of ordinary skill in the art that various changes in form and details may be made therein without departing from the spirit and scope as defined by the following claims. When required, the embodiments of the disclosure may be combined. For example, parts of an embodiment and parts of another embodiment of the disclosure may be combined with one another. Also, modified embodiments of the disclosure based on the technical concept of the embodiments of the disclosure may be executable in another system such as an LTE system, a 5G system, or an NR system.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of a first base station in a wireless communication system, the method comprising:
   determining a parameter associated with repeated transmissions of a sounding reference signal (SRS) based on a first sub-carrier spacing for the first base station and one or more second sub-carrier spacings for one or more second base stations;
   transmitting, to a terminal, the determined parameter associated with the repeated transmissions of the SRS; and
   performing positioning of the terminal based on the SRS repeatedly transmitted from the terminal.

2. The method of claim 1, wherein the parameter comprises a comb value associated with the SRS.

3. The method of claim 1, wherein the first sub-carrier spacing and the one or more second sub-carrier spacings correspond to a first bandwidth part and one or more second bandwidth parts, respectively.

4. The method of claim 1, wherein the determining of the parameter comprises:
   determining, among the one or more second sub-carrier spacings, one or more third sub-carrier spacings that are smaller than the first sub-carrier spacing; and
   determining a ratio associated with the first sub-carrier spacing and the determined one or more third sub-carrier spacings by dividing the first sub-carrier spacing by the smallest sub-carrier spacing among the one or more third sub-carrier spacings.

5. The method of claim 4, wherein the SRS is repeatedly transmitted from the terminal as many times as the determined ratio.

6. A method of a terminal in a wireless communication system, the method comprising:
   receiving, from a first base station, a parameter associated with repeated transmissions of a sounding reference signal (SRS); and transmitting, to the first base station and one or more second base stations, the SRS for positioning of the terminal repeatedly, wherein the parameter is determined based on a first sub-carrier spacing for the first base station and one or more second sub-carrier spacings for the one or more second base stations.

7. The method of claim 6, wherein the parameter comprises a comb value associated with the SRS.

8. The method of claim 6, wherein the first sub-carrier spacing and the one or more second sub-carrier spacings correspond to a first bandwidth part and one or more second bandwidth parts, respectively.

9. A first base station in a wireless communication system, the first base station comprising:

a transceiver; and at least one processor configured to:

determine a parameter associated with repeated transmissions of a sounding reference signal (SRS) based on a first sub-carrier spacing for the first base station and one or more second sub-carrier spacings for one or more second base stations, respectively;

transmit, via the transceiver, the determined parameter associated with the repeated transmissions of the SRS to a terminal;

perform positioning of the terminal based on the SRS repeatedly transmitted from the terminal.

10. The first base station of claim 9, wherein the parameter comprises a comb value associated with the SRS.

11. The first base station of claim 9, wherein the first sub-carrier spacing and the one or more second sub-carrier spacings correspond to a first bandwidth part and one or more second bandwidth parts, respectively.

12. The first base station of claim 11, wherein the at least one processor is further configured to:

determine, among the one or more second sub-carrier spacings, one or more third sub-carrier spacings that are smaller than the first sub-carrier spacing; and determine a ratio associated with the first sub-carrier spacing and the determined one or more third sub-carrier spacings by dividing the first sub-carrier spacing by the smallest sub-carrier spacing among the one or more third sub-carrier spacings, wherein the SRS is repeatedly transmitted from the terminal as many times as the determined ratio.

13. A terminal in a wireless communication system, the terminal comprising:

a transceiver; and at least one processor configured to:

receive, via the transceiver, a parameter associated with repeated transmissions of a sounding reference signal (SRS) from a first base station; and transmit, via the transceiver, the SRS for positioning of the terminal repeatedly to the first base station and one or more second base stations, wherein the parameter is determined based on a first sub-carrier spacing for the first base station and one or more second sub-carrier spacings for the one or more second base stations.

14. The terminal of claim 13, wherein the parameter comprises a comb value associated with the SRS.

15. The terminal of claim 13, wherein the first sub-carrier spacing and the one or more second sub-carrier spacings correspond to a first bandwidth part and one or more second bandwidth parts, respectively.

* * * * *